US006233646B1

(12) United States Patent
Hahm

(10) Patent No.: US 6,233,646 B1
(45) Date of Patent: May 15, 2001

(54) MEMORY INTERFACE CONTROLLER

(75) Inventor: Jin Ho Hahm, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 09/143,081

(22) Filed: Aug. 28, 1998

(51) Int. Cl.[7] .................................................. G06F 12/00
(52) U.S. Cl. ................................. 711/2; 711/156
(58) Field of Search ................................. 711/114, 108, 711/2, 156

Primary Examiner—Matthew Kim
Assistant Examiner—Matthew D. Anderson
(74) Attorney, Agent, or Firm—Cohen, Pontani, Lieberman & Pavane

(57) ABSTRACT

The present invention relates to a memory interface controller for a data transmission system. A memory interface controller is capable of randomly accessing a memory using an associative memory and variably processing data using an extended memory. There is provided a memory interface controller which includes a control logic unit for selectively outputting signals; a comparand register for storing a sequence number; an associative memory for outputting a match address; a priority address encoder for outputting a priority match address; an external memory controller for outputting an empty address of the associative memory; an external tended memory controller for outputting a priority empty address; and an extended memory address and control signal generator for generating an address and a control signal (enable/read/write).

8 Claims, 7 Drawing Sheets

MEMORY INTERFACE CONTROLLER

BACKGROUND OF THE INVENTION

1. Field of the Invention

The present invention relates to a memory interface controller for a data transmission system, and in particular, to an improved memory interface controller which is capable of randomly accessing a memory using an associative memory and processing data variable-length using an extended memory.

2. Description of the Conventional Art

In the data transmission system, when data are transmitted by the data frame unit of a data link level, the data to be transmitted are sequentially stored in a buffer and then transmitted. If a data frame is missed or an error occurs in the data frame, the data are retransmitted using a known buffer memory by a software-based processing method.

The above-described software-based processing methods using a known buffer memory are disclosed in the following patents and articles.

First, a U.S. Pat. No. 5,404,483 filed on Jun. 29, 1990 by the inventors "Rebecca L. Stamm et al. and entitled "Processor and method for delaying the processing of cache coherency transactions during outstanding cache fills" is disclosed.

In the patent '483, since the data are distributed to multi processor computers, it is needed to check where the data are distributed in the computer system. Namely, the patent '483 is directed to storing the address of the designated memory, storing the same into a content addressable memory, accessing the content addressable memory and then searching the address of the memory in which the data are stored.

There is another patent entitled "Address translation circuit used for paging, segmentation in power PC architecture" having a U.S. Pat. No. 0,222,779 and filed on Apr. 4, 1994.

The above-described patent '779 is directed to configuring an address converter using a content addressable memory for implementing a data paging and segmentation when configuring a data processing block in a processor chip.

An article entitled "Searching databases for words: CAM (CContent Addressable Memory)" is disclosed by NASA on the web server.

The above-described article is obtained based on various web servers with respect to the content addressable memory. In this article, it is known that the CAM is applicable to a neutral network and pattern recognition.

There is another article of "1995 Project summaries: Content addressable memory project" by DARPA on the web server.

The above-described article is made based on "a content addressable memory project" by Rutgers university.

In this project, the CAM is employed for an application such as a data base which is not supported by a conventional architecture. The project is directed to a new architecture for substituting a conventional memory, not the processor in the computer system.

The thusly manufactured memory has a good performance for processing a large capacity data.

There is another article entitled "CAM5 specification" by CNU and NASA.

This article is made based on a CAM standard of a 256 work×32-bit and a combined project of Christopher New-port University (CNU), NASA and CEBAT National institute. In the article, a 3-layer CMOS having 68 pins and 0.8 microns is disclosed.

In addition, several articles are searched on the internet using Altavista, which is one of the strongest web browsers. As a result of the search, about 400 items are matched. Among these articles, the following articles will be explained.

In an article entitled "RNS 1250 series VME bus FDDI adaptor" by RNS, a FDDI adaptor card using a content addressable memory, by the RNS is disclosed. This card is directed to detecting a group address using a CAM of 512×48-bit.

In another article entitled "Circuit arrangement for line units of an ATM switching equipment" by MicroPatent on the web server, a CAM used for processing a path information of a virtual connection in an ATM switching is disclosed.

In another article entitled "GIGA switch system: A high performance packet-switching platform" by DEC on the web server", the GIGA switch which is capable of processing a polynomial of 47 degrees using a CAM in a crossbar switch fabric of 36 point 100 Mbps is disclosed.

In another article entitled "Memory hierarchy" by Rutgers university on the web server, a characteristic and application method of a content addressable memory which is made based on several memory structures is disclosed. Here, the CAM is called as an associate memory and is capable of reading a corresponding data when a RAM applies an address. The CAM is capable of obtaining an address stored in a corresponding data when a data is applied.

In another article entitled "The 80196KC microcontroller" by Intel on the web server, the chip is a 16-bit data and 16-bit address chip which is capable of processing an event of a timer for outputting data at high speed.

In another article entitled "Associate memory" by J. P. Hayes in A McGrow-Hill, a data sheet of a content addressable memory is disclosed.

However, in the above-described patents, in order to easily obtain an address information of the memory, the address information of the content addressable memory is stored, and a data value to be searched is applied using a content addressable memory as a basic function. In the conventional art, a function capable of processing a data block having a variable length as an identifier is not disclosed.

In accordance with a research trend and application range of a CAM field of the above-described articles, the CAM is used for a routing table matching in a pattern matching operation and communication for a neural network and an intelligent system and a polynomial computation of a data for a data communication. In the above-described articles, the feature of the content addressable memory project is not disclosed except in the content addressable memory project implemented by Rutgers university. The data processing by Rutgers university is basically directed to the CAM. Therefore, it is known that the subject matters of the present invention are not disclosed in the above-described patents and articles.

SUMMARY OF THE INVENTION

Accordingly, it is an object of the present invention to provide a memory interface controller which overcomes the aforementioned problems encountered in the conventional art.

It is another object of the present invention to provide a memory interface controller which is capable of randomly accessing a memory using an associative memory and variably processing data using an extended memory.

In order to achieve the above objects, there is provided a mermory interface controller which includes a control logic unit for selectively outputting a 9-bit priority match address (8:0), a 9-bit externalmemory empty address, a 9-bit memory empty address, a 9-bit extended memory empty address, a read enable signal RD, a write enable signal WR, a Daisy-chain enable signal and an enable signal in accordance with a 16-bit sequence number SN 16, a 2-bit instruction signal, a 8-bit data signal, a 9-bit priority match address, a 9-bit external memory empty address, and a 9-bit external extended memory empty address for thereby controlling a read/write operation of the data; a comparand register for storing a sequence number SN from the control logic unit; an associative memory for comparing the SN stored in the comparand register with a previously stored SN and outputting a match address in accordance with a result of the comparison; a priority address encoder for outputting a priority match address from the associative memory to the control logic unit; an external memory controller enabled in accordance with an enable signal from the control logic unit for outputting an empty address of the associative memory; an external tended memory controller for outputting a priority empty address from each block of the extended RAM to the control logic unit in accordance with an enable signal from the control logic unit; and an extended memory address and control signal generator for generating an address and a control signal (enable/read/write) and outputting to the RAM and the extended RAM in accordance with a read enable signal RD, a write enable signal WR, a priority match address, an extended memory empty flag address and an extended memory flag address from the control logic unit.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
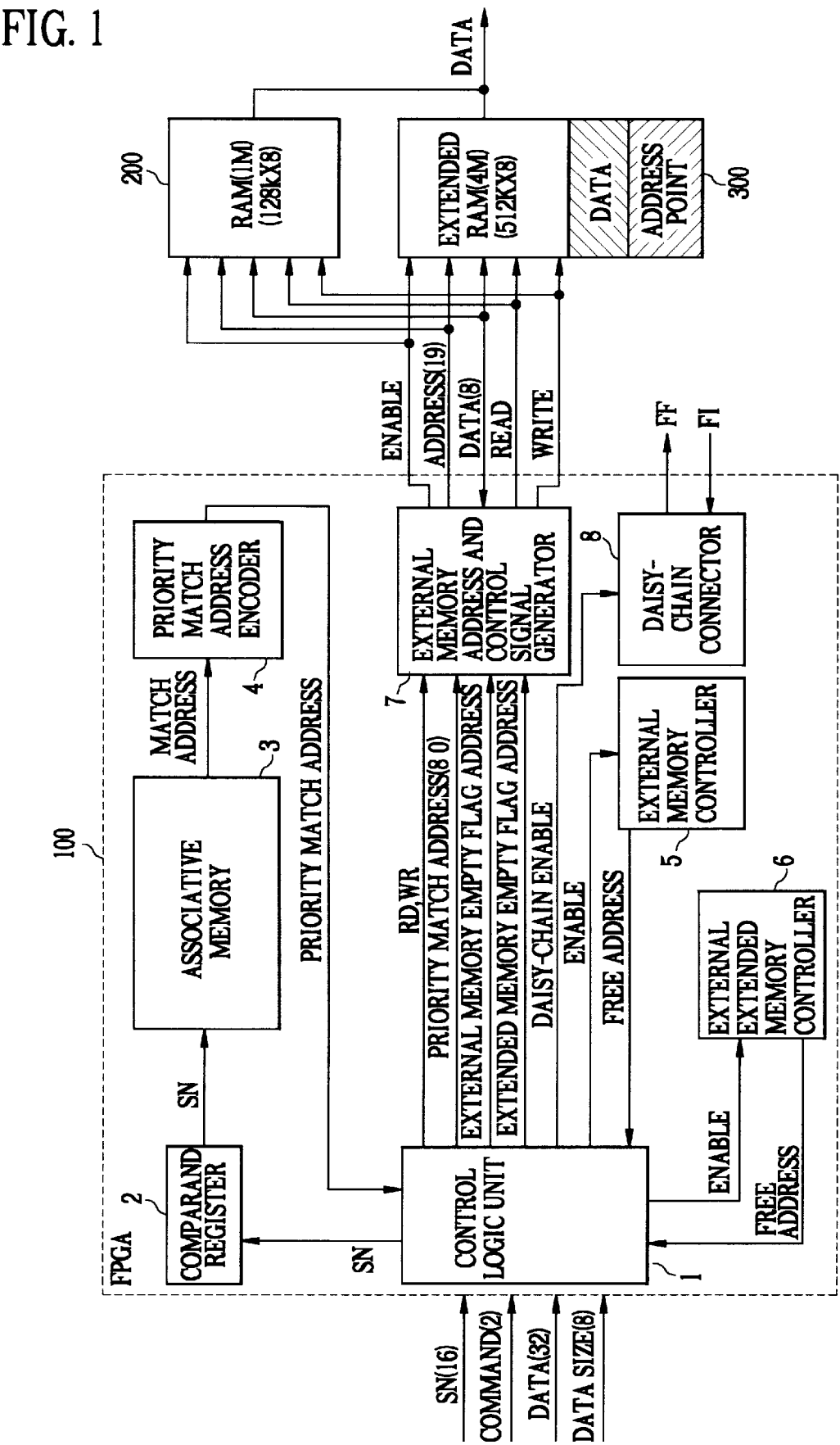
FIG. 1 is a block diagram illustrating a memory interface controller according to the present invention.

FIG. 1 is a block diagram illustrating a memory interface controller according to the present invention.

As shown therein, the memory interface controller according to the present invention includes a field programmable gate array (FPGA) 100 for storing a 32-bit input data DATA 32 into a RAM 200 or an extended RAM 300 in accordance with a 16-bit sequence number SN 16, a 2-bit instruction signal, a 8-bit data signal, a 9-bit priority match address, a 9-bit external memory empty address, a 9-bit external extended memory empty address and a 9-bit priority match address.

The FPGA 100 includes a control logic unit 1 for selecting a 9-bit priority match address (8:0), a 9-bit external memory empty address, a 9-bit memory empty address, a 9-bit extended memory empty address, a read enable signal RD, a write enable signal WR, a Daisy-chain enable signal and an enable signal in accordance with a 16-bit sequence number SN 16, a 2-bit instruction signal, a 8-bit data signal, a 9-bit priority match address, a 9-bit external Memory empty address, and a 9-bit external extended memory empty address for thereby controlling a read/write operation of the data, a comparand register 2 for storing a sequence number SN from the control logic unit 1, an associative memory 3 for comparing the SN stored in the comparand register 2 with a previously stored SN and outputting a match address in accordance with a result of the comparison, a priority address encoder 4 for outputting a priority match address from the associative memory 3 to the control logic unit 1, an external memory controller 5 enabled in accordance with an enable signal from the control logic unit 1 for outputting an empty address of the associative memory 3, an external extended memory controller 6 for outputting a priority empty address from each block of the extended RAM 300 to the control logic unit 1 in accordance with an enable signal from the control logic unit 1, and an extended memory address and control signal generator 7 for generating an address 19 and a control signal (enable/read/write) and outputting to the RAM 200 and the extended RAM 300 in accordance with a read enable signal RD, a write enable signal WR, a priority match address, an extended memory empty flag address and an extended memory flag address from the control logic unit 1.

Figure 2:
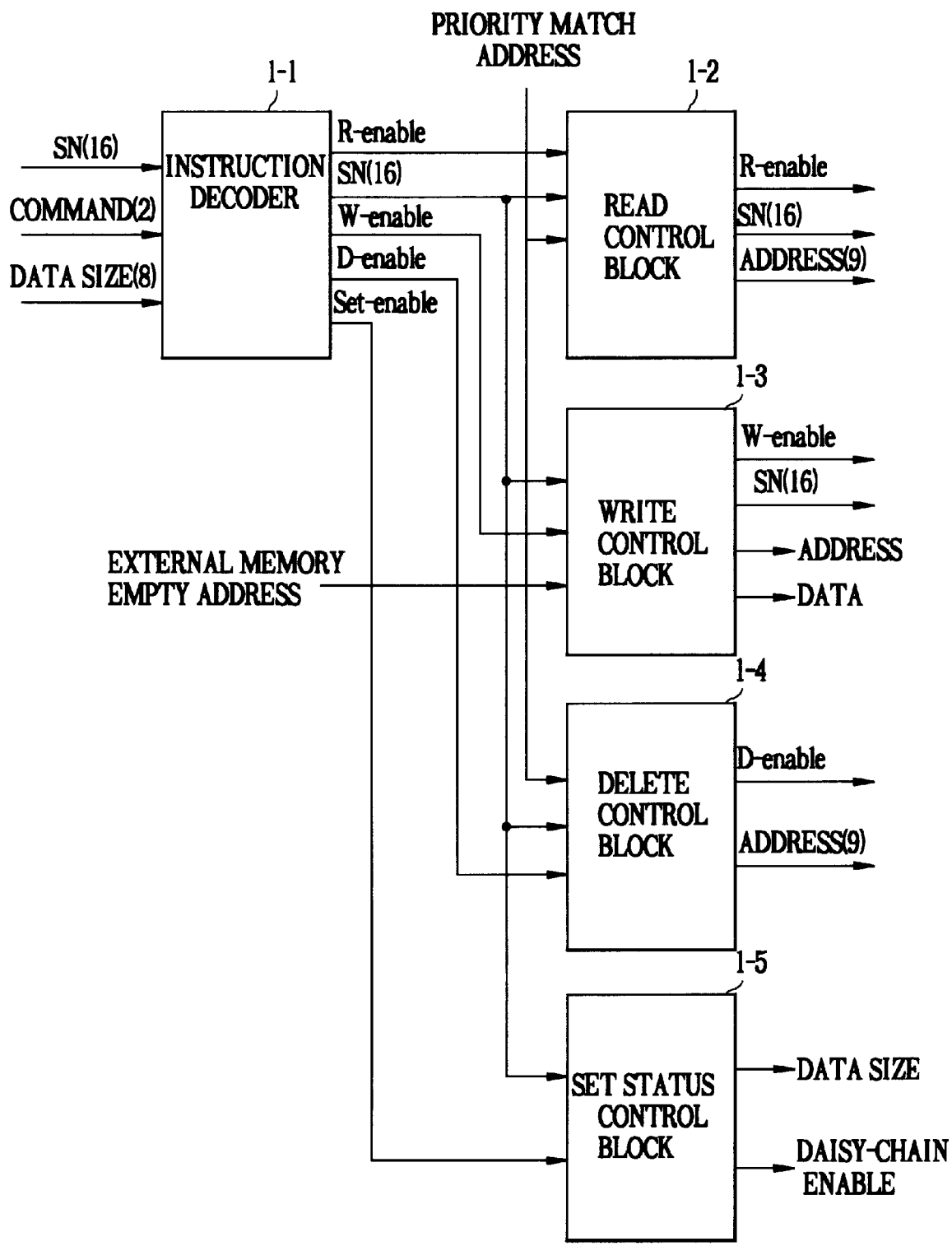
FIG. 2 is a block diagram illustrating the control logic unit of FIG. 1.

FIG. 2 is a block diagram illustrating the control logic unit of FIG. 1.

As shown therein, the control logic unit 1 includes an instruction decoder 1-1 for generating a read enable signal R-enable, a write enable signal W-enable, a delete enable signal W-enable, a set status enable signal Set-enable, a sequence number SN in accordance with a 2-bit instruction signal by decoding a 2-bit instruction signal, a sequence number SN and a data signal, a read control block 1-2 enabled in accordance with an enable signal R-enable from the instruction decoder 1-1 for decoding a sequence number SN, outputting the decoded sequence number to the comparand register 2, decoding a priority match address and outputting the address and the sequence number SN to the external memory address control signal generator 7, a write control block 1-3 enabled in with a write enable signal from the instruction decoder 1-1 for receiving the SN from the instruction decoder 1-1 in accordance with a priority empty address from the external memory controller 5, outputting to the comparand register 2 and outputting a write enable signal W-enable and an address and data to the external memory address and control signal generator 7, a delete control block 1-4 enabled, in accordance with a delete enable signal D-enable from the instruction decoder 1-1 for outputting the SN from the priority match address encoder 4 to the comparand register 2, setting the internal flag from the external memory controller 5 to "0" in accordance with a priority match address signal from the priority match address encoder 4 and outputting a delete enable signal D-enable and an address to the external memory address and control signal generator 7, and a set status control block 1-5 for storing a data size and daisy-chain enable signal in accordance with a set enable signal from the instruction decoder 1-1.

Figure 3A:
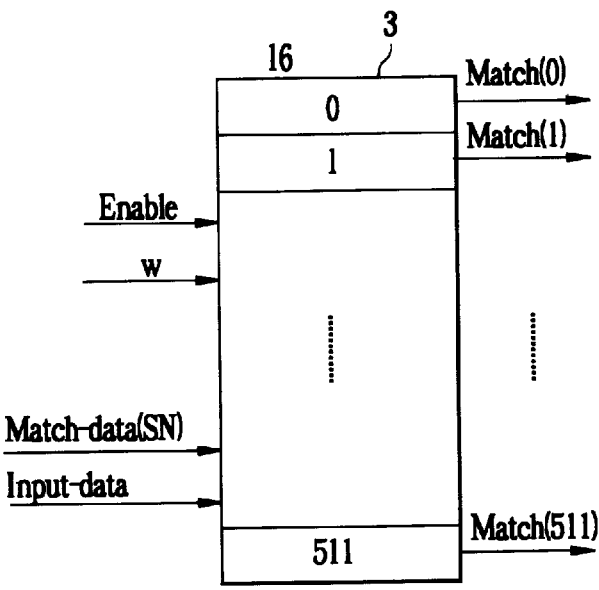
FIGS. 3A and 3B are block diagrams illustrating the associative memory of FIG. 1.
Figure 3B:
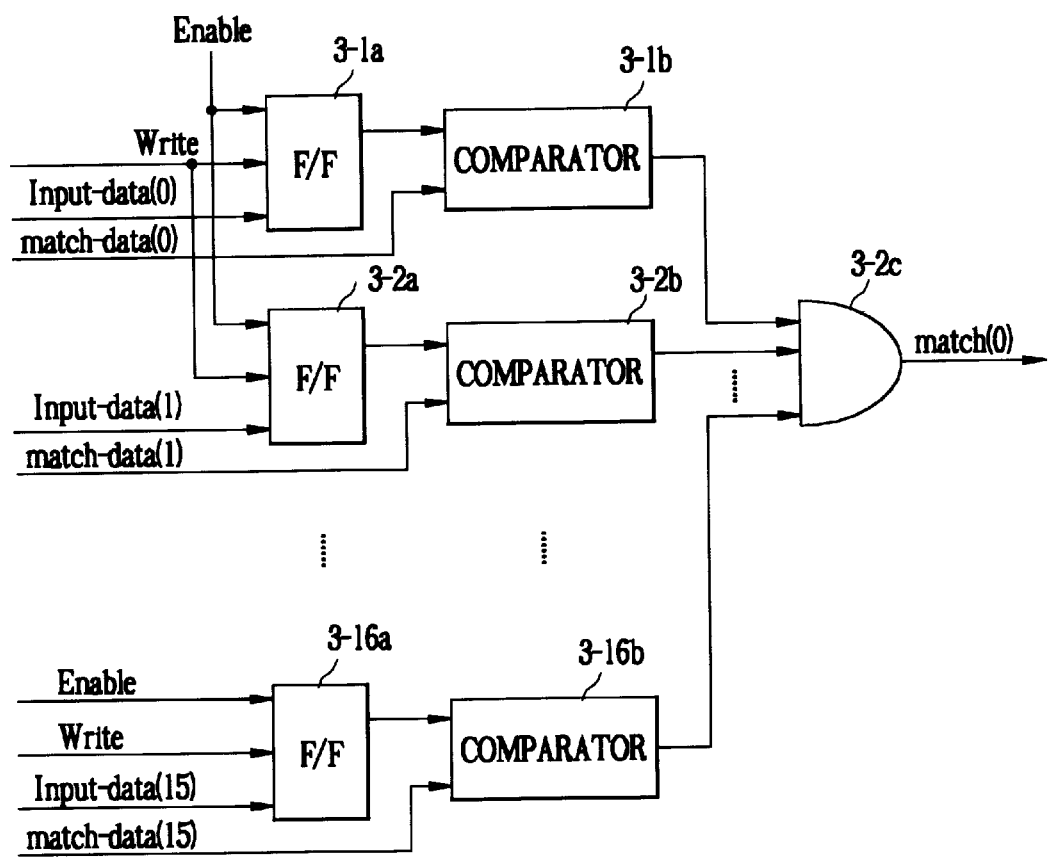

FIGS. 3A and 3B are block diagrams illustrating the associative memory of FIG. 1.

As shown in FIG. 3A, the associative memory 3 includes 512 16-bit registers for storing a SN signal from the comparand register 2 in accordance with a write enable signal, comparing the SN signal (input-data) with a SN signal (match-data) in accordance with an enable signal and outputting a result of the comparison.

As shown in FIG. 3B, each of the 512 16-bit registers 3 includes 16 flip-flops 3-1$a$ through 3-16$a$ for storing a SN (input-data) from the comparand register 2 in accordance with a write enable signal W and outputting the previously stored SN (input-data) in accordance with an enable signal, 16 comparators 3-1$b$ through 3-16$b$ for comparing the SN signal (input-data) from the 16 flip-flops 3-1$a$ through 3-16$a$ with the 16-bit SN signal (match-register) from the comparand register 2 and outputting a result of the comparison, and an AND-gate 3-2 for ANDing the comparison results from the 16 comparators 3-1$b$ through 3-16$b$ and outputting match address match 0 through match 511.

Figure 4:
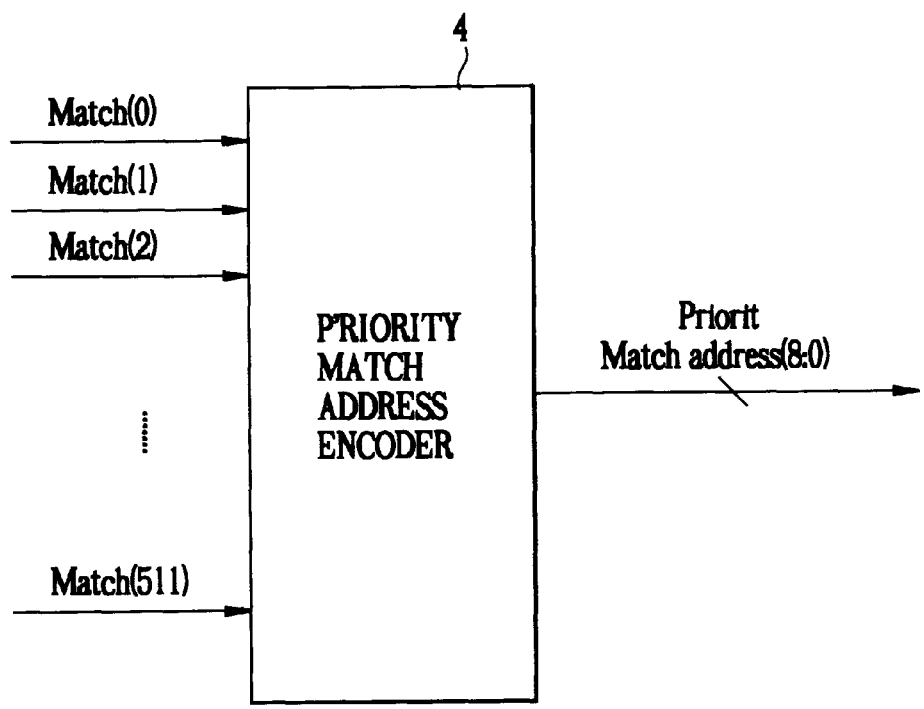
FIG. 4 is a view illustrating an input/output address from the priority match address encoder of FIG. 1.

FIG. 4 is a view illustrating an input/output address from the priority match address encoder of FIG. 1.

As shown therein, the priority match address encoder 4 outputs a priority match address among 512 match addresses Match 0 through match 511 from the associative memory 3.

Figure 5:
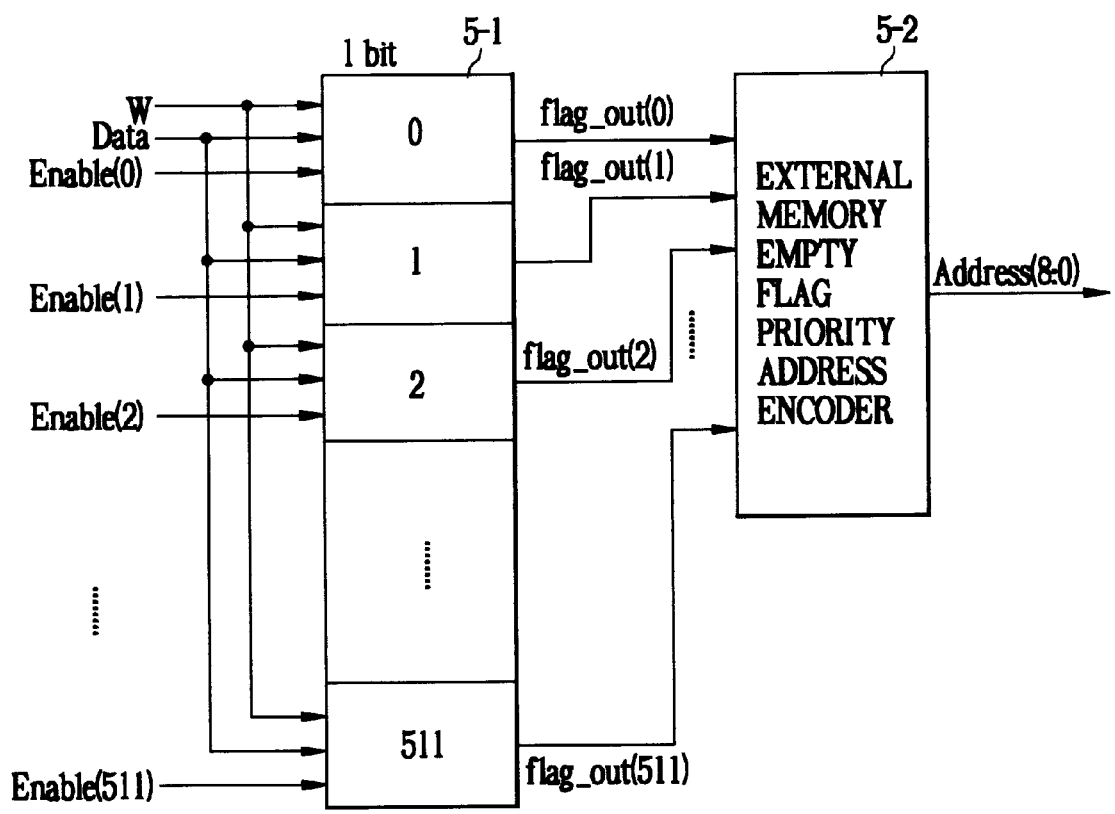
FIG. 5 is a block diagram illustrating the external memory controller of FIG. 1.

FIG. 5 is a block diagram illustrating the external memory controller of FIG. 1.

As shown therein, the external memory controller 5 includes 512 1-bit flip-flops 5-1 for storing a valid and empty state flag with respect to each address of an associative memory 3 in accordance with a write enable signal W and outputting a valid and empty state flag in accordance with enable signals Enable1 through 511 from the control logic unit 1, and an external memory flag priority address encoder 5-2 for outputting a priority state flag of an empty state flag among the valid and empty state flags Flag-out0 through 511 from the flip-flop 5-1.

Figure 6:
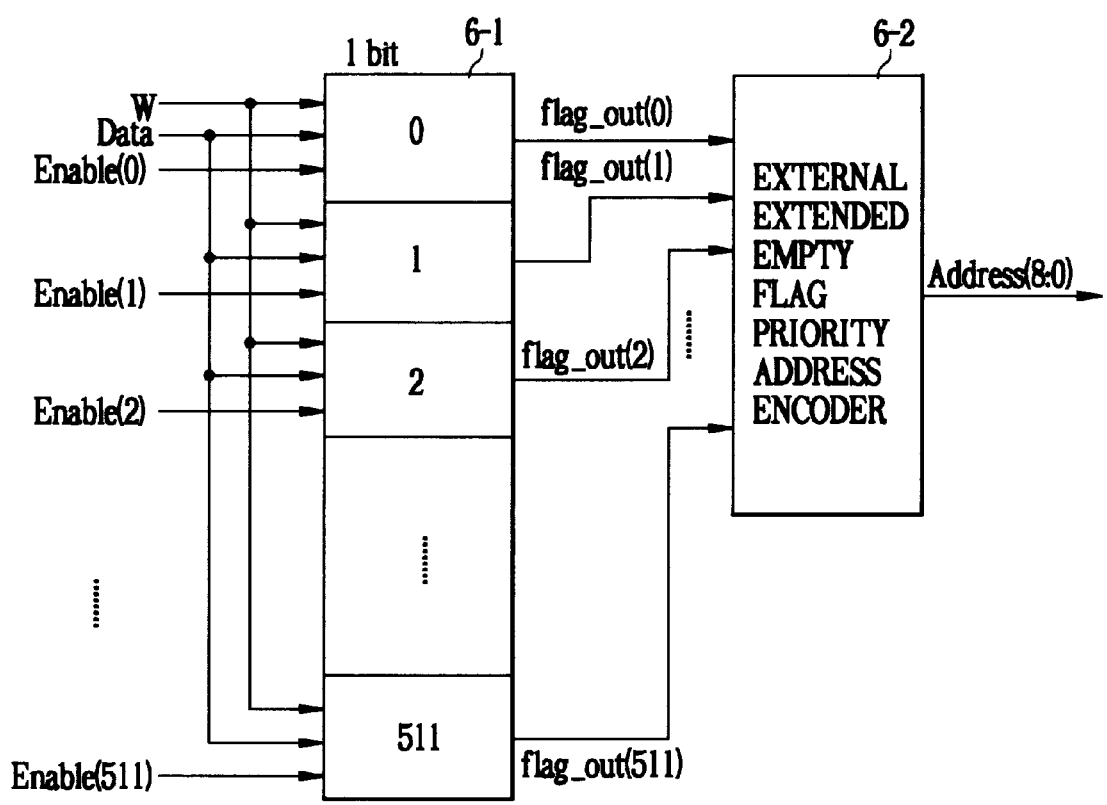
FIG. 6 is a block diagram illustrating the external extended memory controller of FIG. 1.

FIG. 6 is a block diagram illustrating the external extended memory controller of FIG. 1.

As shown therein, the external extended memory controller 6 includes 512 1-bit flip-flops 6-1 for storing an empty or valid state flag of each block of the extended RAM 300 in accordance with a write enable signal W and outputting an empty or valid state flag in accordance with enable signals Enable0 through 511 from the control logic unit 1, and an external extended memory empty flag priority address encoder 6-2 for outputting a priority valid state flag among the valid state flags of the flags Flag-out0 through 511 from the flip-flop 6-1.

Figure 7:
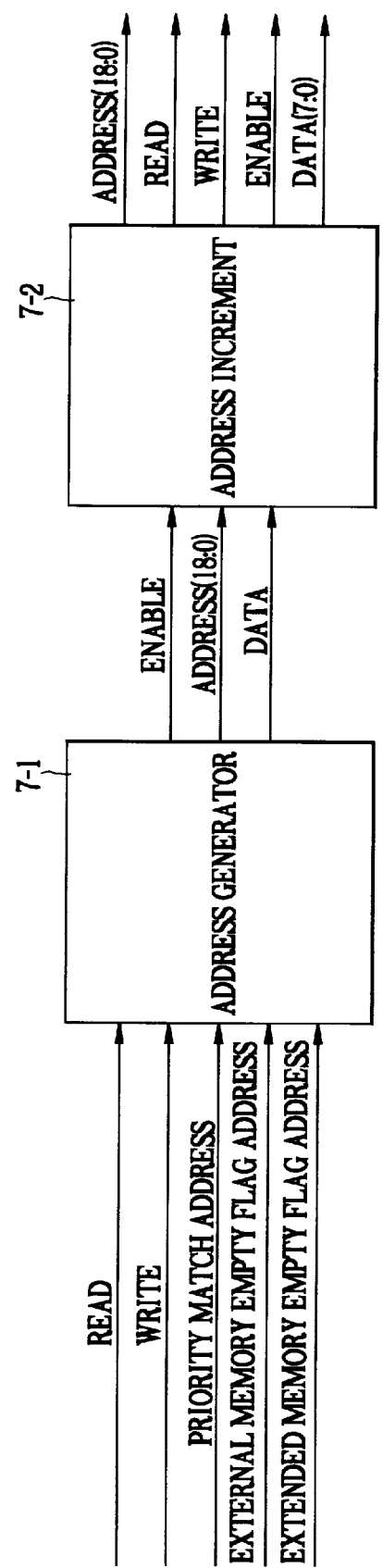
FIG. 7 is a block diagram illustrating the external memory address and control signal generator of FIG. 1.

FIG. 7 is a block diagram illustrating the external memory address and control signal generator of FIG. 1.

As shown therein, the external memory address and control signal generator 7 includes an address generator 7-1 for generating a 19-bit address in accordance with a read and write enable signal, a priority match address, an external empty flag address and an external extended memory empty flag address, and an address increment unit 7-2 for incrementing an address from the address generator 7-1 and an address by "1" with reference to the size of the data from the control logic unit 1 and outputting a read, write enable signal, an enable signal and a 9-bit data.

The operation of the memory interface controller according to the present invention will be explained with reference to the accompanying drawings.

As shown in FIG. 1, in the FPGA 100, the control logic unit 1 outputs a 9-bit priority match address (8:0), a 9-bit external memory empty address, a 9-bit extended memory empty address, a read enable signal RD, a write enable signal WR, a Daisy-chain enable signal and an enable signal Enable in accordance with a 16-bit sequence number SN 16, a 2-bit instruction signal, a 8-bit data size signal, a 9-bit priority match address, a 9-bit external empty address, a 9-bit external extended memory empty address and a 9-bit priority match address for thereby controlling a read/write operation of the data.

The comparand register 2 stores a sequence number SN from the control logic unit 1.

The associative memory 3 compares the SN stored in the comparand register 2 with a previously stored SN and outputs a match address in accordance with a result of the comparison.

The priority match address encoder 4 outputs a priority match address among the match addresses from the associative memory 2 to the control logic unit 1, and the external memory controller 5 is enabled in accordance with an enable signal from the control logic unit 1.

The external extended memory controller 6 is enabled in accordance with an enable signal from the control logic unit 1 and outputs a priority empty address of each block of the extended RAM 300 to the control logic unit 1.

The memory address and control signal generator 7 generates an address and a control signal (Enable/Read/Write) and outputs to the RAM 200 or the extended RAM 300 in accordance with a read enable signal RD, a write enable signal WR, a priority match address signal, an external memory empty flag address and an extended memory empty flag address from the control logic unit 1.

As shown in FIG. 2, the instruction decoder 1-1 of the control logic unit 1 decodes a 2-bit instruction and sequence number SN and a data size and generates a read enable signal R-enable, a write enable signal W-enable, a delete enable signal, a set status enable signal Set-enable and a sequence number SN in accordance with a decoded 2-bit signal.

The read control block 1-2 is enabled in accordance with a read enable signal R-enable from the instruction decoder 1-1, decodes a sequence number SN, outputs to the comparand register 2, decodes a priority match address and outputs the address signal and the sequence number SN to the external memory address and control signal generator 7.

The write control block 1-3 is enabled in accordance with a write enable signal W-enable from the instruction decoder 1-1, receives a SN from the instruction decoder 1-1 in accordance with a priority empty address from the external memory controller 5, outputs to the comparand register 2 and outputs the write enable signal W-enable, an address and a data to the external memory address and control signal generator 7.

The delete control block 1-4 is enabled in accordance with a delete enable signal D-enable from the instruction decoder 1-1, outputs a SN from the instruction decoder 1-1 to the comparand register 2, sets the internal flag of the external memory controller 5 to "0" in accordance with a priority match address from the priority match address encoder 4 and outputs the delete enable signal D-enable and the address to the external memory address and control signal generator 7.

The set status control block 1-5 stores a data size and Daisy-chain enable signal in accordance with a set enable signal from the instruction decoder 1-1.

As shown in FIG. 3A, in the associative memory 3, the 512 16-bit registers 3 store the SN (input-data) from the comparand register 2 in accordance with a write enable signal W and compares the SN (input-data) stored in accordance with an enable signal with the SN (match-data) from the comparand register 2 for thereby outputting a result of the comparison.

As shown in FIG. 3B, 16 flip-flops 3-1a through 3-16b of the 16-bit register 3 store the SN (input-data) from the comparand register 2 in accordance with a write enable signal W and outputs the SN (input-data) stored in accordance with an enable signal Enable. 16 comparators 3-1b through 3-16b compare each SN(input-data) from the 16 flip-flops 3-1a through 3-16a with the 16-bit SN (match-register) from the comparand register 2 and outputs a result of the comparison.

The AND-gate 3-2 ANDs the outputs from the 16 comparators 3-1b through 3-16b and outputs the match addresses (match0 through 511).

As shown in FIG. 4, the priority match address encoder 4 outputs a priority match address among the 512 match addresses (Match0 through 511) from the associative memory 3.

As shown in FIG. 5, the 512 1-bit flip-flop 5-1 of the external memory controller 5 stores the valid and empty state flag with respect to each address of the associative memory 3 in accordance with a write enable signal W and outputs the valid and empty state flags (flag-out0 through flag-out511) in accordance with enable signals (enable1 through 511) from the control logic unit 1.

The external memory empty flag priority address encoder 5-2 outputs a priority empty state flag among the valid and empty state flags (flag-out0 through flag-out511) from the flip-flop 5-1.

As shown in FIG. 6, the 512 1-bit flip-flops 6-1 of the external extended memory controller 6 store the empty or valid state flag of each block of the extended RAM 300 in accordance with a write enable signal W and output an empty or valid state flag in accordance with enable signals (enable0 through 511) from the control logic unit 1.

The external extended memory empty flag priority address encoder 6-2 outputs a priority valid state flag among the flags (flag-out0 through flag-out511) from the flip-flop 6-1.

As shown in FIG. 7, the address generator 7-1 of the external memory address and control signal generator 7 generates a 19-bit address in accordance with read and write enable signals, a priority match address, an external memory empty flag address and an external extended memory empty flag address.

The address increment unit 7-2 increments the address from the address generator 7-1 and the address by "1" with reference to the data size from the control logic unit-1 and outputs a read and write enable signal and a 9-bit data.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A memory interface controller, comprising:

a control logic unit for selectively outputting a 9-bit priority match address (8:0), a 9-bit external memory empty address, a 9-bit memory empty address, a 9-bit extended memory empty address, a read enable signal RD, a write enable signal WR, a Daisy-chain enable signal and an enable signal in accordance with a 16-bit sequence number SN(16), a 2-bit instruction signal, a 8-bit data signal, a 9-bit priority match address, a 9-bit external memory empty address, and a 9-bit external extended memory empty address thereby controlling a read/write operation of the data;

a comparand register for storing a sequence number SN from the control logic unit;

an associative memory having a plurality of 16-bit registers for comparing the SN stored in the comparand register with a previously stored SN and outputting a match address in accordance with a result of the comparison;

a priority address encoder for outputting a priority match address from the associative memory to the control logic unit;

an external memory controller enabled in accordance with an enable signal from the control logic unit for outputting an empty address of the associative memory;

an external extended memory controller for outputting a priority empty address from each block of an extended RAM to the control logic unit in accordance with an enable signal from the control logic unit; and an extended memory address and control signal generator for generating an address and a control signal (enable/read/write) and outputting to the RAM and the extended RAM in accordance with a read enable signal RD, a write enable signal WR, a priority match address, an extended memory empty flag address and an extended memory flag address from the control logic unit.

2. The controller of claim 1, wherein said control logic unit comprises:

an instruction decoder for generating a read enable signal R-enable, a write enable signal W-enable, a delete enable signal D-enable, a set status enable signal Set-enable, a sequence number SN in accordance with a 2-bit instruction signal by decoding a 2-bit instruction signal, a sequence number SN and a data signal;

a read control block enabled in accordance with an enable signal R-enable from the instruction decoder for decoding a sequence number SN, outputting the decoded sequence number to the comparand register, decoding a priority match address and outputting the address and the sequence number SN to the external memory address control signal generator;

a write control block enabled in accordance with a write enable signal from the instruction decoder for receiving the SN from the instruction decoder in accordance with a priority empty address from the external memory controller, outputting to the comparand register and outputting a write enable signal W-enable and an address and data to the external memory address and control signal generator;

a delete control block enabled in accordance with a delete enable signal D-enable from the instruction decoder for outputting the SN from the priority match address encoder to the comparand register, setting an internal flag from the external memory controller to "0" in accordance with a priority match address signal from the priority address encoder and outputting a delete enable signal D-enable and an address to the external memory address and control signal generator; and a set status control block for storing a data size and daisy-chain enable signal in accordance with a set enable signal from the instruction decoder.

3. The controller of claim 1, wherein said associative memory includes 512 16-bit registers for storing a SN signal from the comparand register in accordance with a write enable signal, comparing the SN signal with a SN signal in accordance with an enable signal and outputting a result of the comparison.

4. The controller of claim 1, wherein each of said 16-bit registers includes:

16 flip-flops for storing a SN from the comparand register in accordance with a write enable signal W and outputting the previously stored in accordance with an enable signal; and 16 comparators for comparing the SN signal from the 16 flip-flops with the 16-bit SN signal from the comparand register and outputting a result of the comparison, and an AND-gate for ANDing the comparison results from the 16 comparators and outputting match address matches.

5. The controller of claim 1, wherein said priority address encoder outputs a priority match address among 512 match addresses from the associative memory.

6. The controller of claim 1, wherein said external memory controller 5 includes:

512 1-bit flip-flops for storing a valid and empty state flag with respect to each address of an associative memory in accordance with a write enable signal W and outputting a valid and empty state flag in accordance with enable signals from control logic unit; and an external memory flag priority address encoder for outputting a priority state flag of an empty state flag, among the valid and empty state flags from the flip-flop.

7. The controller of claim 1, wherein said external extended memory controller includes:

512 1-bit flip-flops for storing an empty or valid state flag of each block of the extended RAM in accordance with a write enable signal W and outputting an empty or valid state flag in accordance with enable signals from the control logic unit; and an external extended memory empty flag priority address encoder for outputting a priority valid state flag among the valid state flags of the flags from the flip-flops.

8. The controller of claim 1, wherein said external memory address and control signal generator includes:

an address generator for generating a 19-bit address in accordance with a read and write enable signal, a priority match address, an external empty flag address and an external extended memory empty flag address; and an address increment unit for incrementing an address from the address generator and an address by "1" with reference to a size of the data from the control logic unit and outputting a read, write enable signal, an enable signal and a 9-bit data.

* * * * *